United States Patent Office 3,449,824
Patented June 17, 1969

3,449,824

METHOD FOR PREPARING A FERROELECTRIC BODY AND DEVICES

George H. Heilmeier, Philadelphia, Pa., and Louis A. Zanoni, Trenton, N.J., assignors to Radio Corporation of America, a corporation of Delaware No Drawing. Filed Oct. 26, 1964, Ser. No. 406,548
Int. Cl. B01j *17/00;* H01g *13/00;* H01l *11/14*
U.S. Cl. 29—571 5 Claims

ABSTRACT OF THE DISCLOSURE

A method of reducing residual surface charge on a ferroelectric body comprises heating the body above its Curie temperature in a vacuum and then bombarding the heated body with ions.

This invention relates to an improved method for preparing a ferroelectric body which has a reduced density of residual surface charge, and to preparing electronic devices which include this body.

In order to take full advantage of the non-linear polarizability of a ferroelectric body in the field effect modulation of semiconductor conductivity, it is required that the ferroelectric body provide an external electric field which terminates in the adjacent semiconductor. Ferroelectric bodies usually do not provide such a field when polarized because a high density of residual charges are attracted to the surface of the ferroelectric body and the field terminates in these charges. For example, in one type of field effect transistor, a ferroelectric body insulates a gate electrode from a body of bandgap material (either semiconducting or insulating). The polarization of the ferroelectric body produces an external electric field which ideally extends into the body of bandgap material and controllably affects the conductivity of part or all of the bandgap material. The useful part of this external electric field is reduced in present ferroelectric bodies because residual charges are present at the surface of the ferroelectric body and effectively short circuit or terminate part or all of the electric field at the surface of the ferroelectric body, preventing or reducing its extension into the adjacent bandgap material.

It has been suggested previously that residual charges may be removed from the surface of semiconductors and insulators by exposing the surface to a glow discharge in relatively low vacuum. This technique does not work for a ferroelectric body because the ion bombardment of a glow discharge polarizes the ferroelectric body. This polarization attracts stray ions and charges to the surface of the ferroelectric body, thereby increasing the concentration of residual charges at that surface.

An object of this invention is to provide a method for preparing a ferroelectric body having a reduced density of residual surface charge.

A further object of this invention is to provide an improved method for preparing a ferroelectric device.

Another object is to provide an improved method for preparing a device of the type having a ferroelectric body in contact with a layer or coating of bandgap material.

In general, the method of the invention includes heating a ferroelectric body above the Curie temperature thereof in a vacuum and then bombarding a surface of the heated body with ions, as with a glow discharge. Since the ferroelectric body is above its Curie temperature, it is not polarized and does not become polarized by the ion bombardment. With no polarization in the body, ambient ions and charges are not attracted to the surface of the body and little or no charge concentrations form on the surface of the body.

A field effect transistor may now be fabricated with this ferroelectric body by producing a layer of bandgap material on the heated ion-bombarded surface, connecting spaced source and drain contacts to the bandgap material, and producing a gate electrode on the surface of the ferroelectric body opposite the layer.

Example 1

The novel method described herein may be used to prepare a field effect transistor having an insulated ferroelectric gate structure by the following procedure: A single crystal platelet of barium titanate about 500 mils by 500 mils by about 4 mils thick is chemically etched in hot aqueous phosphoric acid to clean the surfaces thereof. The platelet is dried and then mounted over a hole on a substrate and placed in a vacuum evaporation apparatus. The mounted platelet is heated to about 200° C., which is above the Curie temperature for barium titanate, in a low vacuum of about $5 \times 10^{-2}$ mm. Hg for about 15 minutes. A surface of the heated platelet is then subjected to a glow discharge in the low vacuum for about three minutes. The glow discharge is stopped, the vacuum is increased to about $2 \times 10^{-6}$ mm. Hg, and a source-drain mask is positioned over the one surface of the platelet. Gold metal is evaporated through the source-drain mask upon the one surface to form thereon source and drain contacts about 2.5 mm. long by about 0.5 mm. wide spaced about 25 microns apart. The source-drain mask is removed and a channel mask is substituted. Then, elemental tellurium is evaporated and deposited through the mask on the surface of the platelet between and overlapping the source and drain contacts, forming a tellurium layer about 30 to 50 Angstrom units thick and having a resistivity of about 1 to 10 ohm-centimeters. During the deposition of tellurium, the platelet may be either above or below its Curie temperature, but is preferably above its Curie temperature, especially for ferroelectric materials that become polarized upon cooling. The channel mask is removed and a gate mask is positioned over the opposite surface of the platelet. Gold metal is evaporated and deposited through the gate mask on the opposite surface of the platelet, thereby forming a gate electrode on the device about 25 microns long by about 2.5 mm. wide. The device is now removed from the vacuum apparatus and leads are connected to the contacts and electrodes.

The device of Example 1 exhibits a hysteretic transfer characteristic (drain current versus gate voltage). The saturation currents at the extremes of the characteristic are about 0.22 milliampere and about 0.63 milliampere for gate voltages of about +20 volts and −3 volts respectively. If a similar process were used, but omitting the step of cleaning the surface of the ferroelectric body of charges by ion bombardment while the ferroelectric body is above its Curie temperature, the drain currents would show a much narrower swing (if indeed any swing at all) of about 0.25 to about 0.32 milliamepere for the same gate voltages mentioned above. If higher gate voltages are applied, such device made by the similar process would experience break-down across the ferroelectric body before achieving the drain currents mentioned above.

Example 2

This example is similar to that of Example 1 except that the ferroelectric body is a single crystal platelet of triglycine sulfate about 500 mils by 500 mils by about 25 mils thick, and the heating above its Curie temperature is conducted at about 90° C. for about 15 minutes. The saturation current at the extremes of the transfer characteristic are about 0.2 milliampere and about 0.002 milliampere at gate voltages of about +25 volts and −10 volts, respectively. The drain voltage is about +3 volts for these values.

The novel method described herein may be used to prepare any ferroelectric body, either single crystal or polycrystalline. Some suitable ferroelectric materials are barium titanate and its homologues, Rochelle salt, ammonium dihydrogen phosphate and its homologues, guanadinium aluminum sulfate hexahydrate and its homologues, and triglycine sulfate and its homologues. The preferred ferroelectric materials have a high polarization and are chemically and electrically stable to changes in temperature and atmosphere.

An important feature of the novel process is that the ferroelectric body is heated above its Curie temperature during ionic bombardment and preferably also during the deposition of the bandgap material. The Curie temperature differs for each ferroelectric material. The Curie temperature for a particular material is usually well known, and can be ascertained with suitable accuracy by simple test. Obviously, it is desirable that the ferroelectric body be chemically stable at the temperature above the Curie temperature at which it is heated during processing.

When the ferroelectric body is above its Curie temperature, the surface of the body is exposed to bombardment by ions. A glow discharge in a poor vacuum is a convenient and economical way of achieving this. However, higher vacuums may be used and other sources of ions may be used.

Where a device structure is being prepared comprising a layer or coating of bandgap material on a ferroelectric body, the bandgap material may be semiconducting or insulating, organic or inorganic. A bandgap material is a material in which there is an energy bandgap; that is, an energy interval in which there are ordinarily no allowed states for current carriers. The terms "semiconducting" and "insulating" mean that the bandgap material may have an intermediate or a high resistivity. The bandgap material preferably has a high resistivity and has free carriers with a high mobility. The size of the bandgap in the bandgap material may be small or large. The bandgap material should be capable of being deposited as a layer or coating on the surface of the ferroelectric body by some technique; for example, by vapor deposition, by sputtering, or by melting and freezing. Some suitable bandgap materials are: silicon, cadmium sulfide, tellurium, selenium, and copper phthalocyanine. It is preferred that the bandgap material be deposited as soon as possible after ionic bombardment, as described above, and while the ferroelectric body is in vacuum and heated above its Curie temperature.

What is claimed is:

1. A method for preparing a ferroelectric device comprising
   (1) heating a ferroelectric body above the Curie temperature thereof in vacuum,
   (2) bombarding a surface of said heated body with ions, and then
   (3) depositing a layer of bandgap material upon said heated ion-bombarded surface while in said vacuum.

2. A method for preparing a ferroelectric device comprising
   (1) heating a ferroelectric body above the Curie temperature thereof in vacuum,
   (2) bombarding a surface of said heated body with ions,
   (3) depositing a layer of bandgap material upon said heated ion-bombarded surface while in said vacuum, and then
   (4) depositing a layer of metal over spaced portions of said bandgap layer.

3. A method for preparing a ferroelectric device comprising
   (1) heating a ferroelectric body having two opposed surfaces above the Curie temperature thereof in vacuum,
   (2) bombarding said surface of said heated body with ions,
   (3) depositing a layer of bandgap material upon one of said heated ion-bombarded surfaces while in said vacuum,
   (4) producing spaced contacts to said layer of bandgap material, and
   (5) producing a gate electrode upon the other of said surfaces in a position opposite the space between said spaced contacts.

4. A method for preparing a ferroelectric device comprising
   (1) heating a crystal of barium titanate at about 200° C. in a vacuum of about $2\times10^{-6}$ mm. Hg,
   (2) bombarding a surface of said heated body with ions, and then
   (3) depositing a layer of elemental tellurium upon said heated ion-bombarded surface while in said vacuum.

5. A method for preparing a ferroelectric device comprising
   (1) heating a crystal of triglycine sulfate at about 90° C. in a vacuum of about $2\times10^{-6}$ mm. Hg,
   (2) bombarding a surface of said heated body with ions, and then
   (3) depositing a layer of elemental tellurium upon said heated ion-bombarded surface while in said vacuum.

References Cited

UNITED STATES PATENTS

| | | | |
|---|---|---|---|
| 2,791,759 | 5/1957 | Brown. | |
| 2,852,400 | 9/1958 | Remeika | 252—62.9 X |
| 3,222,283 | 12/1965 | Illyn et al. | 252—62.9 |
| 3,298,863 | 1/1967 | McCusker | 29—584 |

JOHN F. CAMPBELL, *Primary Examiner.*

PAUL M. COHEN, *Assistant Examiner.*

U.S. Cl. X.R.

29—25.35, 572, 610, 620; 117—93.3; 252—62.51